United States Patent [19]
Burri

[11] Patent Number: 5,206,571
[45] Date of Patent: Apr. 27, 1993

[54] STEPPER MOTOR CONTROLLERS

[75] Inventor: Michel Burri, Gd-Saconnex, Switzerland

[73] Assignee: Motorola, Inc., Schaumburg, Ill.

[21] Appl. No.: 695,078

[22] Filed: May 3, 1991

[30] Foreign Application Priority Data

May 25, 1990 [GB] United Kingdom ............... 9011704

[51] Int. Cl.⁵ .............................................. G05B 19/40
[52] U.S. Cl. ..................................... 318/685; 318/696
[58] Field of Search ................................ 318/685, 696

[56] References Cited
U.S. PATENT DOCUMENTS 4,658,194 4/1987 Richter et al. ............... 318/685 X
4,734,632 3/1988 Kamikura et al. ............. 318/685
4,775,902 10/1988 Trovato et al. ............... 318/685 X Primary Examiner—William M. Shoop, Jr.
Assistant Examiner—Karen Masih
Attorney, Agent, or Firm—Bradley J. Botsch, Sr.

[57] ABSTRACT

A driver for a stepper motor including means (Q45, 45, 47, 402) for sampling the current in a motor winding (43) at an instant determined by means (401, 400) for generating a predetermined delay following winding commutation. The sample is compared with winding current by a comparator (403) the output of which is stored at a subsequent instant in a flip-flop (416) to provide an output (42). Current generated within the windings due to rotor motion provide a difference in output when the motor is running or blocked. The invention provides a solution to the problem of motion detection of a stepper motor without recourse to a positional sensor.

11 Claims, 5 Drawing Sheets

STEPPER MOTOR CONTROLLERS

FIELD OF THE INVENTION

The present invention relates to stepper motor controllers and in particular to a novel type of controller providing motion sensing.

BACKGROUND OF THE INVENTION

Stepper motors are widely used in applications in which an accurate positioning of an output shaft is to be provided, their advantage being that the output can be moved to any desired position from a known starting position simply by generating an appropriate number of pulses to drive the shaft incrementally. Stepper motors can thus be operated in an open loop configuration and so there can be a great cost advantage over servo-systems since neither a positional sensor nor feedback control system is required.

The precise mechanical constructions of stepper motors are many and various, but generally a multiple pole motor together with a multi-phase stator winding is employed. The greater the number of poles and phases, the greater the resolution in the positional increment which may be achieved. Multi-phase motors are also capable of high power. Whatever the construction, a stepper motor controller is required to generate, from an applied input pulse, appropriate currents to the motor windings to make the axis of the air gap field step around in coincidence with the input pulse.

In some applications, the movement of the motor may be limited by hard end stops. A mechanical output shaft may be limited to 90° of rotation, for example, the stepper motor shaft may be subject to similar angular limitation or, if the motor drives the output shaft via a gearbox for example, to a maximum number of continuous revolutions. Either way, the motor will be blocked if an attempt is made to drive it past an end stop. Fortunately however, this does not result in damage to the motor since the current demand of the coils does not change between the running condition and the stall condition. Indeed, this property makes the use of stepper motors attractive where loads are to be driven hard against an end stop since no sensing system is required to shut down the currents.

It will be appreciated that due to the differential nature of the position control, stepper motors are not suitable for applications in which absolute positional accuracy is necessary and movement relative to a known reference cannot be guaranteed: an application in which the motor may be become blocked for example. Once motion in response to a pulse is blocked, positional accuracy is lost. This can be overcome by fitting a positional or motion sensor at the output but to do so is to loose one of the major advantages of the stepper motor. Hence, use of stepper motors in many applications where they would otherwise be desirable has heretofore been limited.

SUMMARY OF THE INVENTION

In accordance with the present invention there is provided a stepper motor winding driver including means for detecting a winding current superimposed on that due to winding electrical parameters and for providing an output derived from detection indicative of motor rotation.

Preferably said detection means is arranged to detect an oscillatory current and advantageously includes a peak detector and may further include a sample and hold circuit which may provide an input to a comparator.

In a preferred arrangement of the present invention said detection means includes a sample and hold circuit which is triggered after a predetermined interval following coil commutation, advantageously defined by motor mechanical characteristics. Preferably, the predetermined interval is defined by substantially the instant of peak motor rotor motion with respect to the winding field.

The predetermined interval may be provided by a counter output or by a signal derived from a winding drive signal.

BRIEF DESCRIPTION OF THE DRAWINGS

In order that features and advantages of the present invention may be further appreciated, an embodiment and the use of an embodiment will now be described, by way of example only, with reference to the accompanying diagrammatic drawings, of which.

DETAILED DESCRIPTION OF THE INVENTION

Figure 1:
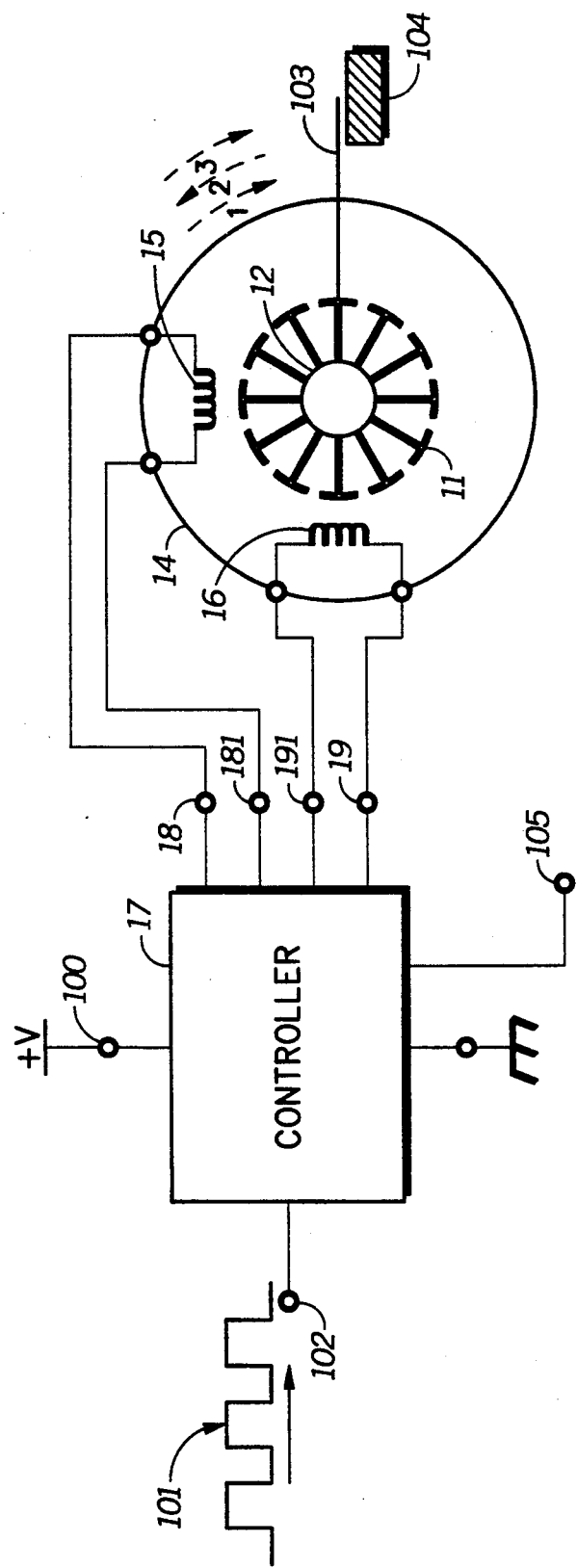
FIG. 1 represents a stepper motor control arrangement.

A stepper motor 10 includes a six pole pair rotor 11 rotatable about an output shaft 12 acting as the rotor axis. A stator ring 14 of the motor 10 carries a four phase winding made up of windings 15 and 16. The motor is controlled by a stepper motor controller 17 which generates currents at its outputs 18 and 19, 181 and 191 in response to a pulse train 101 received at its input 102. Outputs 18 and 19 are respectively connected to stator windings 15 and 16 so that the currents generated excite the coils to drive the motor 10 in response to the input 101. Power is supplied to the arrangement by power supply connection 100 of controller 17. The rotation of the motor 11 is limited by a wiper 103, which is rigidly connected to output shaft 12, impinging upon an end stop 104. The end stop 104 is active in both directions of rotation so that the maximum continuous rotation of the output shaft is limited to one revolution thereby, or indeed less if the initial position of the wiper 103 is away from its stop 104.

It will be appreciated that the motor 10 as depicted is of six pole pair, four phase construction, leading to a motor having twenty-four possible rotational positions or steps which may be conveniently designated as n, where n is an integer between 1 and 24.

As is well known in the art of stepping motors, the controller 17 must create a rotating magnetic field in the air gap of the motor 10 to drive it in rotation in response to an input pulse train.

Typically, a controller is arranged to drive a current through each of the coils in either directions, relative commutations of the currents from one direction to the other establishing a rotating magnetic field in the required direction. Idealised drive waveforms 20 and 21 (FIG. 2(a) and (b)) show a commutation pattern that may be generated by controller 1 and applied to motor coils 15 and 16 respectively to drive the motor from position 0 at 22 to position 4 at 23 each commutation driving the rotor from one angular position to the next. The waveform as shown would be sufficient to drive the motor beyond 4 in rotation but in practice no rotation beyond $2\pi$ occurs due to co-operation of wiper 103 with end stop 104 and the motor is blocked at 23 (position 4).

Figure 3:
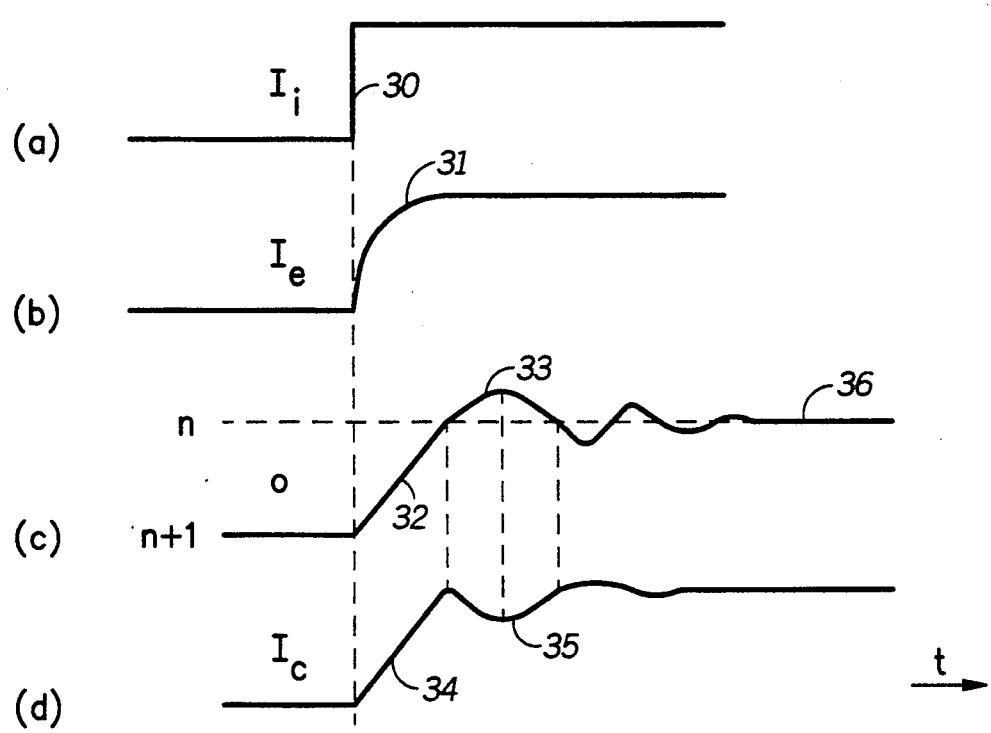
FIG. 3 represents a stepper motor controller forming part of the control arrangement of FIG. 1.

The behaviour of the motor in response to a commutation will now be considered in more detail, for example the response to a single commutation 30 (FIG. 3(a)) driving the rotor from angular position to n+1.

Waveform 30 (FIG. 3) represents an idealized commutation current drive signal, as might be generated by controller 17. Since the motor winding to be driven constitutes a coil having both inductance and resistance, current in the coil will be given by the well known relationship:

$$I(s) = V(s)/(R + sL) \quad (1)$$

where I is the winding current, V(s) the exciting voltage, R and L respectively the coil resistance and inductance, and S is the Laplace operator. The resulting current int eh winding due to this electrical constraint will thus be of the form depicted at 31 (FIG. 3(b)).

In accordance with the classical model of a dc motor, the angular response $\sigma$ to a winding current i is given by $$K_m I(s) = s^2 J\sigma(s) + sf\sigma(s) \quad (2)$$

where $K_m$ and f are respectively motor and frictional coefficients and J is the inertial mass of the rotating parts. Substituting I(s) (equation (1) for I(s) (equation (2)) gives the transfer function of output angular position with respect to input voltage of:

$$G(s) = \sigma(s)/V(s) = K_m/JL/(s(s+f/J)(s+R/L)) \quad (3)$$

which includes both the electrical and the mechanical time constants of position. Given that in the case of a relatively slow stepping motor for example, the electrical time constant may be neglected with respect to the mechanical time constant, the approximated transfer function is:

$$G(s) = K_m/JL/s(s+f/J) \quad (4)$$

which will be recognised as that of a damped second order system. Hence the positional response of the motor 32 (FIG. 3(c)) shows a damped oscillation with overshoot before settling to its final position 36. As may be seen in FIG. 3, this behaviour may be thought of as an initial phase where the rotor lags the winding current and an overshoot phase 33 where the current is fully commutated but the rotor is still in motion before it comes to rest at 36.

It will be appreciated that this motion generates a current opposing the motion in accordance with Lenz's law, and that the current so generated will appear in super position upon the electrical response of the winding. The resultant coil current 34 (Ic, (FIG. 3(d)) then shows a minimum inflexion point at 35 due to rotor overshoot.

Figure 2:
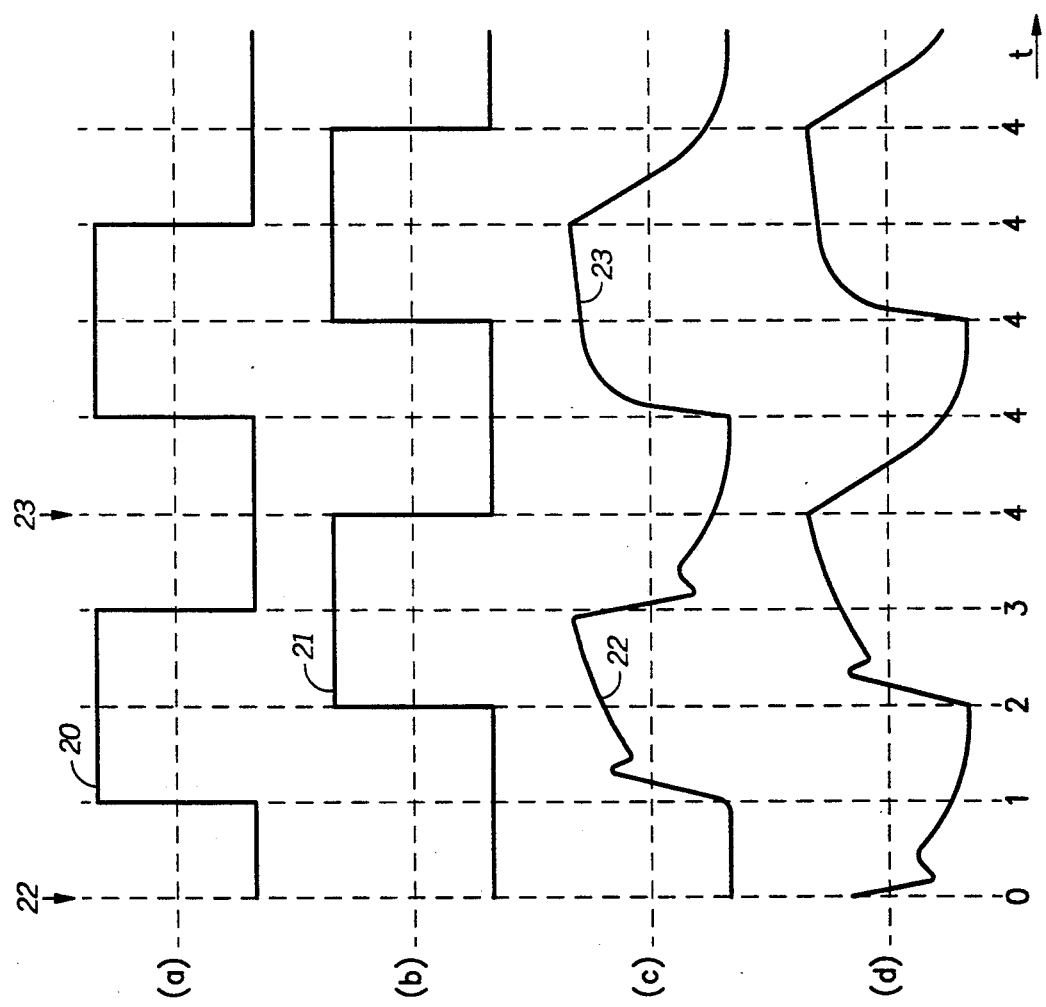
FIG. 2 represents waveforms at points in the arrangement of FIG. 1.

Returning now to FIG. 2, the actual winding current waveforms for the motor 10 may be seen (FIG. 2(c) and (d)) for the rotor in continuous rotation from 0 (at 22) to 4 (at 23). It will be noted that both winding current waveforms exhibit the superimposed oscillation due to rotor overshoot. Once position 4 is reached (at 23) the motor is blocked and the rotor no longer rotates. Since there is no rotation, there is no current super position and the winding current becomes that due to the electrical characteristics of the coils only, as may be seen at 25 on FIG. 2(c). Hence the rotation induced oscillation provides a basis for rotation detection.

In accordance with the present invention, stepper motor controller 17 includes means for detecting an oscillatory winding current as indicative of rotation, and an embodiment of such a controller will now be described in conjunction with an application thereof.

Heretofore, stepper motors have not been used in automotive headlight elevation because no positive motion detection was possible without recourse to a rotation sensor which would negate the stepper motor advantage. In headlight elevation, for example, a motor might be used to drive a light carrier between an open and a closed position in response to a load sensor to adjust headlight angle in response to load distribution or even in response to an attitude sensor actively to control headlight elevation in motion. In a typical arrangement, a motor might drive a headlight between a first stop defining a closed position and a second stop defining a fully open position. So that positional control of reasonable resolution may be achieved, without recourse to a complex multiple pole, multiple phase motor, a gear box may be employed to step down motor rotation. This has the added advantage of reducing the necessary torque rating of the motor. Many motor revolutions might occur for a highlight displacement of a few degrees, but nonetheless eventually a stop will be encountered.

In this application it is mandatory that both headlights are moved similarly since a misalignment is unacceptably dangerous. Positive motion detection is therefore required so that should one light jam, due to icing for example, blocking its motor drive to the motor of the other lamp is halted so that a misalignment does not occur.

It will be appreciated that the present invention provides a stepper motor controller with a motion controller with a motion detection output, and the generation of such an output within a controller will now be described.

Figure 4:
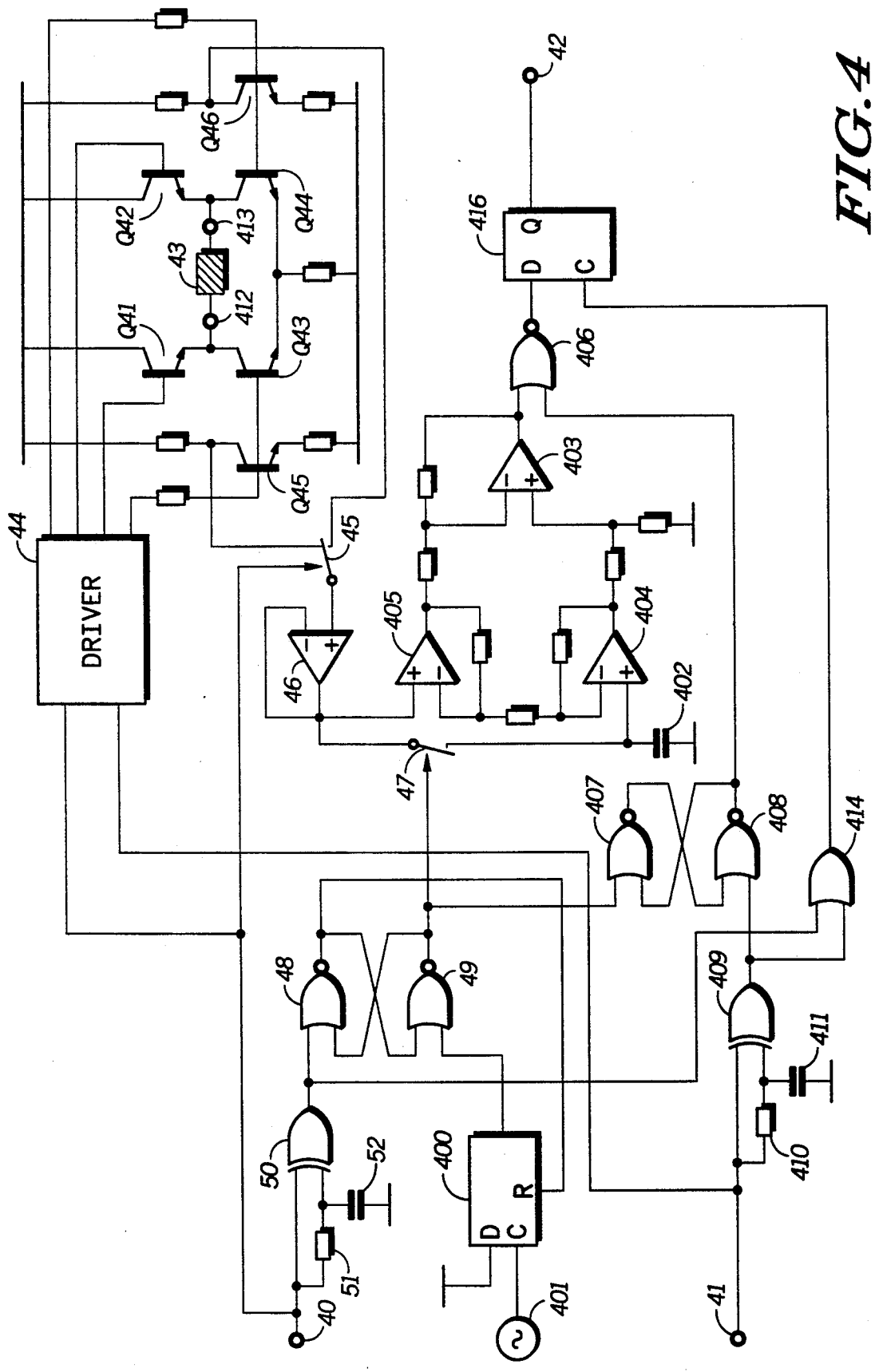
FIG. 4 represents waveforms at points in the controller of FIG. 3.

A stepper motor controller (FIG. 4) has inputs (40, 41) for winding drive signals and an output 42 indicative of motor rotation. Terminals 412 and 413 are provided for connection to a stepper motor winding 43 via a transistor array formed of transistors Q41, Q42, Q43 and Q44 which may be controlled to drive a current through the winding 43 in either direction. When Q41 and Q44 are on current flow is in one direction. Current flow may be reversed by switching Q41 and Q44 off and Q42 and Q43 on. Drive signals for the transistor array are provided by a driver 44 in response to the drive signal inputs to provide current commutation to drive the motor. It will be appreciated that a similar arrangement (not shown) may be provided to drive other windings of the motor, of which there will be one for a two phase motor.

In the case of winding 43, transistors Q45 and Q46 are provided which have a common base connection with respectively transistors Q43 and Q44 of the array. A resistor connected to the commoned emitters of transistors Q43 and Q44 carries the winding current delivered either by transistor Q43 or transistor Q44 and hence a voltage representative of this current develops across it. Dependent upon which transistor (Q43 or Q44) is forward biased, this voltage (plus one junction voltage) is transferred to the base of either Q45 or Q46 which are biased into the linear region. The collector outputs of transistors Q45 and Q46 are connected to opposing poles of a selected switch 45. In operation, one or other of the poles of switch 45 is controlled directly by the drive input so that this pole is selected and passed to the input of a buffer amplifier 46 which feeds a single pole switch 47. Hence a voltage representative of coil current is always present at the input pole of switch 47.

Switch 47 is controlled by a flip-flop formed by NOR gates 48 and 49 which is set when a pulse is produced by the edge sensitive pulse generator formed by EXCLUSIVE-OR gate 50, resistor 51 and capacitor 52. The input of the pulse generator is the winding drive waveform at input 40, so that it is triggered whenever commutation of the winding current occurs. When the flip-flop is set, the output of gate 49 holds switch 47 closed and resets a counter 400, with the output of gate 48. The counter is driven by a fixed frequency clock 401 and in this way, the switch 47 is held closed for a fixed period (counter overflow) following commutation. During this time, the voltage representative of coil current is applied to a capacitor 402. When switch 47 is opened, the voltage will be maintained by virtue of the charge held on capacitor 402 and so a sample and hold arrangement is provided. The voltage across capacitor 402 drives one input of an amplifier 404. The input of comparator 405 is a voltage representative of winding current derived from the output of amplifier 46, the combination of amplifiers 404, 405 and 403 providing an absolute value amplifier with a high common mode rejection ratio. The gain of this absolute value amplifier is arranged by choice of an associated resistor network such that its output is in a first state if the capacitor voltage exceeds the derived voltage substantially and of the other state otherwise. The output of amplifier 403 is connected as a logic input to a NOR gate 406. The other input of the NOR gate 406 is provided by a flip-flop formed by NOR gates 407 and 408 which is reset by an output from NOR gate 49 in readiness to be set by a pulse from a pulse generator constituted by EXCLUSIVE-OR gate 409, resistor 410 and capacitor 411 when an edge is present in the drive signal applied to input 41, being the commutating signal for the non-sampled coil. Setting the flip-flop results in NOR gate 406 being enabled by the output of gate 408 so that the logic state of the comparator is transmitted to the DATA input of a flip flop 416. The value of this state at that instant is clocked into the flip flop 416 by each transition provided by EXCLUSIVE-OR gates 409 and 50 through OR gate 414.

The Q output of flip-flop 416 is provided as output 42 of the stepper motor controller and constitutes a comparison between the value of a voltage representative of the current in winding 34 a fixed interval after winding commutation and the value of that same voltage parameter at the next commutation of the other winding. The significance of this output will now be demonstrated.

Figure 5:
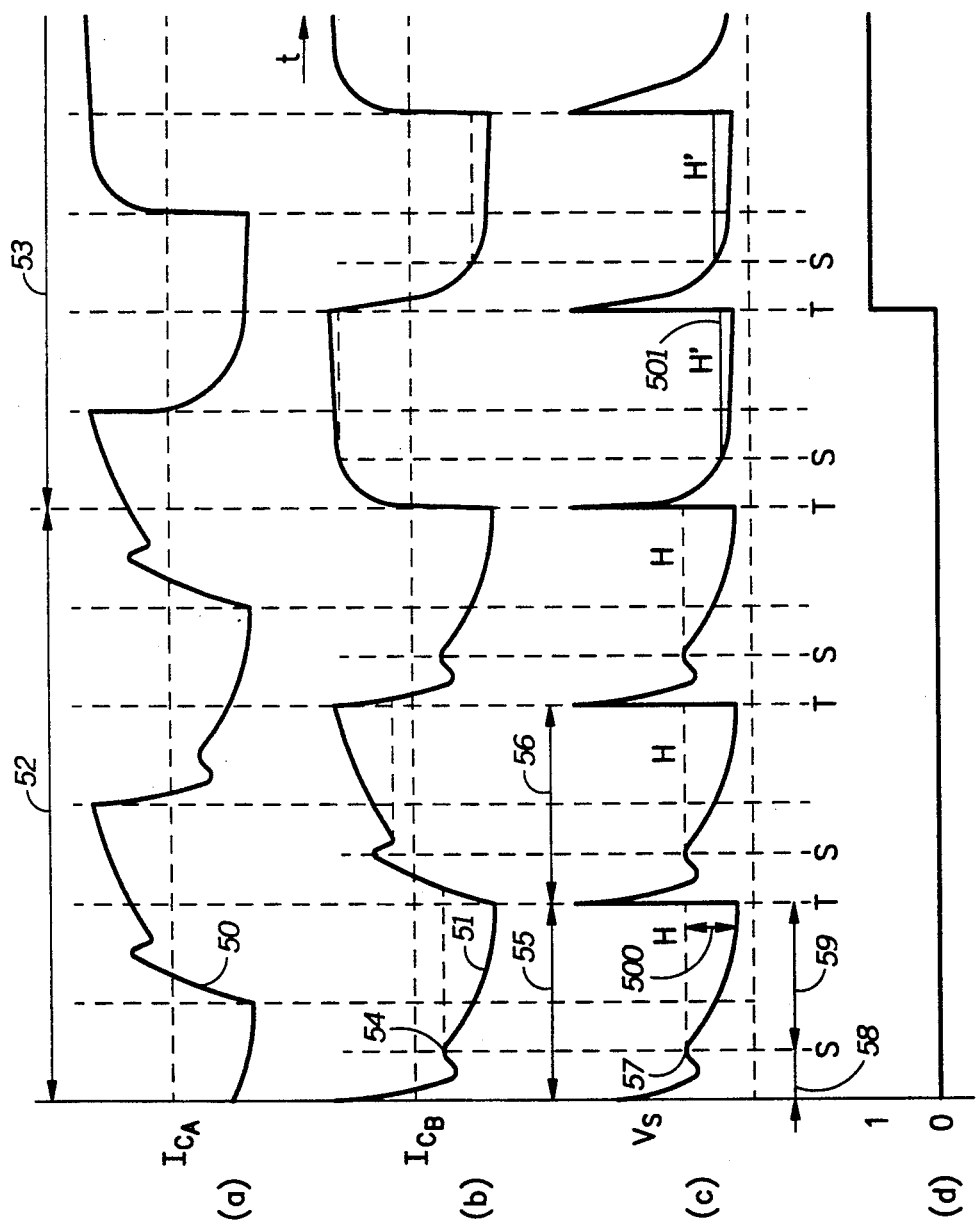
FIG. 5 represents waveforms when there is a one-to-one correspondence between commutation and rotation when blocked.

Waveforms 50 and 51 (FIG. 5(a) and (b)) show winding currents in the windings of a four phase stepper motor during a period of six steps of displacement 52 and a subsequent period 53 when the motor is blocked. It will be observed that during the rotation the current waveforms exhibit oscillation due to mechanical overshoot, at inflexion point 54 for example. It will be noted that no such oscillation occur during blocked period 53. The input applied to amplifier 46 is depicted at FIG. 5(c) and represents the winding current as a rectified signal due to the selection action of switch 45 which selects the conducting transistor out of Q43 and Q44, the voltages of which are in the same sense even through they provide opposing coil current. The inflexion point 54 thus appears at point 57 in the waveform of FIG. 5(c) for example.

Following commutation of the winding whose current is represented at 51, switch 47 connects the voltage representative of winding current across capacitor 402. This same triggering of the flip-flop formed by gates 48 and 49 by the output of pulse generator gate 50 enables the counter 400, which maintains the state of switch 47 for a fixed time (58) until the flip-flop is reset. At this instant switch 47 opens to store a sample (level H) of the applied voltage at time S. The output of amplifier 403 during subsequent period 59 represents a comparison between the stored sample and the current value of the voltage representative of winding current and the state of this comparison is transferred to the flip-flop when coil commutation (T) loads data from enabled gate 406 by virtue of the edge of the commutating waveform (gate 414) appearing at clock input C of flip flop 416. Hence the output 42 is representative of a comparison between the winding current at instants S and T for the immediately previous winding drive half cycle.

The predetermined time 58 between commutation of the winding 43 and the sampling instant is arranged, by selecting an appropriate frequency for clock 401 and range to overflow of the counter 400, to be equal to the mechanical time constant of the motor with respect to the coil current and hence the sampling instant S is substantially coincidence with the inflexion point 57. The sample is maintained on capacitor 402 as hereinbefore described until the comparison is made at instant T. It will be observed that when the motor is running (period 52) the oscillation occurs and that when the motor is blocked (period 53) there can be no oscillation signal there is not relative movement of the rotor with respect to the coil. Hence there is no superimposed current and the waveform of the current in the winding is determined solely by the electrical parameters of the winding itself. Thus when motion occurs, the sample is maintained at level H, yielding a differential comparison 500, whilst when the motor is blocked (period 53) the sample is maintained at lower level H to yield a comparison 501. Hence a basis for motion detection is provided. As previously described, the gain of the absolute value amplifier (403, 404, 405) is arranged to trigger between differential inputs of magnitude 500 and 501 respectively and hence yields a signal indicative of motion at time T. It is this output which is transferred to the flip-flop 416 at instant T to yield an output at 42 indicative of motion (logic 0) or no motion (logic 1) of the motor during a preceding winding current cycle.

It will be appreciated that the predetermined period is a parameter of motor dynamics and is therefore independent of motor voltage supply and winding resistance. It has been observed that for motors of similar type and those used for similar applications there is not a wide variation in this predetermined time. Hence a single detection arrangement design is valid for a wide range of motor constructions and ratings. Nonetheless, it will be further appreciated that the predetermined time may be selected for example by varying the frequency of oscillator to be consistent with a time observed by monitoring the output of a positional sensor attached to a test motor of relevant type of calculated from a knowledge of motor parameters. Indeed the detector as described may be used to set the predetermined time by adjusting the oscillator frequency so that an output indicative of motion and no motion is provided with the motor is respectively observed both running and blocked. Further, it is not essential that the sampling instant occurs precisely at the inflexion point, since this point represents a relatively flat portion of the curve a degree of timing error does not adversely affect detection.

In the embodiment of the present invention described above, the motor speed must not be so great that there is insufficient time for the inflexion to occur. The embodiment is therefore suited to applications in which a motor runs relatively slowly and within its pull-in range where there is a one-to-one correspondence between commutation and rotation when blocked, which is the situation represented in FIG. 5. A typical example would be the headlight control arrangement mentioned earlier. Even if the condition is not met, the invention is still useful although an alternative method of detecting the superimposed current due to motion of the rotor with respect to its driving magnetic field is required: for example, correlation of waveform sample with a stored waveform representative of winding behaviour when the motor is blocked. Even when the motor is driven in the pull out range where the rotor inevitably lags the rotating field, detectable superimposed current will be present. Indeed, even for a high speed motor normally operating in pull out, it is often accelerator through the pull-in range so at least a reliable indication of motor start may be provided.

Returning to the example of the headlight arrangement, it will be realised that the control of the system (not shown) may be made responsive to output 42 to prevent drive to one headlight motor if the other is blocked so that misalignment does not occur. The control may be further be arranged to institute a swing motion if the blocked condition is detected, that is sequential drive in first one direction (1, FIG. 1), then the other direction (2) and finally the first direction again (3). By this means an end stop (motion possible in one direction only) may be differentiated from a blocked motor (no motion possible). Moreover, the two opposing end stops may be differentiated by noting the direction of possible motion. Thus a datum position for the motor may be unambiguously determined to permit subsequent differential positional control.

I claim:

1. A stepper motor controller for providing a drive signal to a stepper motor and for detecting when the driven stepper motor is in a blocked or running state, wherein the blocked state current flowing in a winding of the stepper motor is dependent on the electrical parameters of the winding, said current being the blocked current and in the running state the current flowing int h winding is dependent on a motion current superimposed on the blocked current, wherein the stepper motor controller comprises:

detection means for sampling the current flowing in the winding a predetermined interval after coil commutation and for providing a first output signal in response to detecting the superimposed motion current and a second output signal when no superimposed motion current is detected, wherein the first output signal indicates the stepper motor is in the running state, and the second output signal indicates the stepper motor is in the blocked state.

2. A stepper motor controller as claimed in claim 1 and wherein said detection means is arranged to detect an oscillator current.

3. A stepper motor controller as claimed in claim 2 and wherein said detection means includes a peak detector.

4. A stepper motor controller as claimed in claim 1 and wherein said detection means includes a sample and hold circuit for sampling and holding the current flowing in a winding at predetermined times.

5. A stepper motor controller as claimed in claim 4 and wherein said sample and hold circuit provides an input to a comparator wherein the comparator compares the current flowing in a winding at coil commutation with the current flowing in a winding after the predetermined interval following coil commutation and provides an output difference signal having a first level when the stepper motor is in the running state and a second level when the stepper motor is in the blocked state wherein the first level has a greater magnitude than the second level and the first level represents the first output signal and the second level represents the second output signal.

6. A stepper motor controller as claimed in claim 4 and wherein said sample and hold circuit is triggered after the predetermined interval following coil commutation.

7. A stepper motor controller as claimed in claim 6 and wherein said predetermined interval is defined by motor mechanical parameters.

8. A stepper motor controller as claimed in claim 6 and wherein said predetermined interval is provided by a counter output.

9. A stepper motor controller as claimed in claim 6 and wherein said predetermined interval is provided by a signal derived from a winding drive signal.

10. A stepper motor controller as claimed in claim 6 and wherein said predetermined interval is defined by substantially the instant of a maximum inflexion point in the current flowing in the winding.

11. A stepper motor controller as claimed in claim 1 and wherein said predetermined level is defined by motor mechanical parameters.

* * * * *

UNITED STATES PATENT AND TRADEMARK OFFICE
CERTIFICATE OF CORRECTION

PATENT NO. : 5,206,571
DATED : April 27, 1993
INVENTOR(S) : Michel Burri

It is certified that error appears in the above-indentified patent and that said Letters Patent is hereby corrected as shown below:

In column 8, claim 1, lines 2 and 3, please delete the letters "int h" after the word flowing and before the word winding and insert the words -- in the --.

In column 8, claim 2, line 17, please delete the word "oscillator" and insert the word -- oscillatory --.

In column 8, claim 11, 57, _, please delete the word "level" and insert the word -- interval --.

Signed and Sealed this

Third Day of May, 1994

Attest:

BRUCE LEHMAN

Attesting Officer

Commissioner of Patents and Trademarks